United States Patent
Kurihara et al.

(10) Patent No.: US 10,577,438 B2
(45) Date of Patent: Mar. 3, 2020

(54) POLYFUNCTIONAL POLYMER AND METHOD FOR PRODUCING SAME

(71) Applicant: Mitsui Chemicals Tohcello, Inc., Chiyoda-ku, Tokyo (JP)

(72) Inventors: Hiroyoshi Kurihara, Nagoya (JP); Manami Saito, Nagoya (JP)

(73) Assignee: MITSUI CHEMICALS TOHCELLO, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/758,013

(22) PCT Filed: Jul. 15, 2016

(86) PCT No.: PCT/JP2016/071063
§ 371 (c)(1),
(2) Date: Mar. 7, 2018

(87) PCT Pub. No.: WO2017/047220
PCT Pub. Date: Mar. 23, 2017

(65) Prior Publication Data
US 2018/0244811 A1    Aug. 30, 2018

(30) Foreign Application Priority Data

Sep. 16, 2015 (JP) ................................ 2015-183429

(51) Int. Cl.

| | |
|---|---|
| *C08F 8/30* | (2006.01) |
| *C08G 18/81* | (2006.01) |
| *C08F 220/18* | (2006.01) |
| *C08G 18/62* | (2006.01) |
| *C08F 299/00* | (2006.01) |
| *C09J 175/16* | (2006.01) |
| *C08G 18/22* | (2006.01) |
| *C09D 175/16* | (2006.01) |
| *C08J 3/24* | (2006.01) |
| *C09J 133/06* | (2006.01) |

(52) U.S. Cl.
CPC .............. *C08F 8/30* (2013.01); *C08F 220/18* (2013.01); *C08F 299/00* (2013.01); *C08G 18/227* (2013.01); *C08G 18/6229* (2013.01); *C08G 18/8116* (2013.01); *C08J 3/24* (2013.01); *C09D 175/16* (2013.01); *C09J 133/066* (2013.01); *C09J 175/16* (2013.01); *C08F 2800/20* (2013.01); *C08F 2810/30* (2013.01); *C08G 2170/40* (2013.01); *C08G 2190/00* (2013.01); *C08J 2333/14* (2013.01); *C08J 2375/16* (2013.01)

(58) Field of Classification Search
CPC ........................... C08G 18/73; C08G 18/6229
See application file for complete search history.

(56) References Cited

U.S. PATENT DOCUMENTS

| | | | |
|---|---|---|---|
| 7,264,873 B2 | 9/2007 | Katoh et al. | |
| 9,115,242 B2 | 8/2015 | Jaunky et al. | |
| 2001/0001478 A1* | 5/2001 | Dams ................... | A62D 1/0085 252/2 |
| 2004/0038057 A1 | 2/2004 | Katoh et al. | |
| 2005/0227089 A1* | 10/2005 | Hirakawa ............... | B32B 25/14 428/423.1 |
| 2006/0105132 A1 | 5/2006 | Katoh et al. | |
| 2010/0247880 A1* | 9/2010 | Kano ..................... | B32B 27/28 428/209 |
| 2013/0165586 A1 | 6/2013 | Hashimoto | |
| 2013/0310464 A1 | 11/2013 | Jaunky et al. | |
| 2018/0237672 A1* | 8/2018 | Saito ....................... | C09J 11/06 |

FOREIGN PATENT DOCUMENTS

| | | |
|---|---|---|
| EP | 1391493 A1 | 2/2004 |
| EP | 3348623 A1 | 7/2018 |
| JP | 2002-241732 A | 8/2002 |
| JP | 2002-293853 A | 10/2002 |
| JP | 2009-221297 A | 10/2009 |
| JP | 2013-543042 A | 11/2013 |
| JP | 2014-063951 A | 4/2014 |
| WO | WO 2012/039124 A1 | 3/2012 |

OTHER PUBLICATIONS

International Search Report (PCT/ISA/210) dated Aug. 9, 2016, by the Japanese Patent Office as the International Searching Authority for International Application No. PCT/JP2016/071063.
Written Opinion (PCT/ISA/237) dated Aug. 9, 2016, by the Japanese Patent Office as the International Searching Authority for International Application No. PCT/JP2016/071063.
Extended Search Report issued by the European Patent Office in corresponding European Patent Application No. 16846093.9-1102 dated Mar. 29, 2019 (8 pages).
Notification of Reason for Refusal issued by the Korean Intellectual Property Office in corresponding Korean Patent Application No. 10-2018-7009836 dated Feb. 15, 2019 (8 pages including partial English translation).
The First Office Action issued by the State Intellectual Property Office of People's Republic of China in corresponding Chinese Patent Application No. 201680051617.3 dated Aug. 15, 2019 (22 pages including partial English translation).
Notice of Final Rejection issued by the Korean Intellectual Property Office in corresponding Korean Patent Application No. 10-2018-7009836 dated Oct. 7, 2019 (7 pages including partial English translation).

(Continued)

*Primary Examiner* — Mark S Kaucher
(74) *Attorney, Agent, or Firm* — Buchanan, Ingersoll & Rooney PC

(57) ABSTRACT

The present invention is a method for producing a polyfunctional polymer that contains a structural unit having a urethane bond and a polymerizable unsaturated bond in a side chain, and is characterised by including a reaction process in which a polymer (P) containing a structural unit (a) having a hydroxy group in a side chain and a monomer (M) having an isocyanate group and a polymerizable unsaturated bond are reacted in the presence of a bismuth carboxylate.

4 Claims, No Drawings

(56) References Cited

OTHER PUBLICATIONS

Notice of Final Rejection issued by the Korean Intellectual Property Office in corresponding Korean Patent Application No. 10-2018-7009836 dated Nov. 21, 2019 (7 pages including partial English translation).

Decision of Rejection of Amendment issued by the Korean Intellectual Property Office in corresponding Korean Patent Application No. 10-2018-7009836 dated Nov. 21, 2019 (4 pages including partial English translation).

* cited by examiner

POLYFUNCTIONAL POLYMER AND METHOD FOR PRODUCING SAME

TECHNICAL FIELD

The present invention relates to a polyfunctional polymer suitable as a raw material for a composition used for a pressure-sensitive adhesive (adhesive), a sealant, a coating material, and the like, and a method for producing the same.

BACKGROUND ART

Conventionally, photocurable compositions that can be cured by irradiation with light are widely used for forming a film portion, an applied portion, or a printed portion in a pressure-sensitive adhesive (adhesive), a sealant, a coating material, an ink, and the like. A polyfunctional polymer having a polymerizable unsaturated group in a side chain via a urethane bond is sometimes used as a raw material for the photocurable composition for these uses. As a method for producing the polyfunctional polymer, a method for reacting a polymer having a hydroxy group with a monomer having an isocyanate group using an organotin compound as a catalyst has been suitable (see, for example, Patent Documents 1 and 2).

However, the organotin compound is said to have effects on the human body and the environment in recent years. Its use is restricted by the REACH regulation, and is particularly severely restricted in an electronic material field and a semiconductor producing field.

As a method for using a compound other than the organotin compound as a catalyst, a method for using a titanium complex, a zirconium complex, or the like as a catalyst has been known (see, for example, Patent Document 3).

PRIOR TECHNICAL DOCUMENT

Patent Document

[Patent Document 1] JP-A 2002-241732
[Patent Document 2] JP-A 2002-293853
[Patent Document 3] JP-A 2014-63951

SUMMARY OF THE INVENTION

Problems that the Invention is to Solve

An object of the present invention is to provide a method for efficiently producing a polyfunctional polymer having a urethane bond and a polymerizable unsaturated bond in a side chain by reacting a polymer having a hydroxy group with a monomer having an isocyanate group and a polymerizable unsaturated bond without using a harmful organotin compound.

Means for Solving the Problems

The inventors of the present invention have studied a catalyst that replaces an organotin compound widely used as a catalyst for forming a urethane bond, and a production method of a polyfunctional polymer having a polymerizable unsaturated bond in a side chain via a urethane bond using the catalyst. As a result, a bismuth carboxylate was found to be suitable.

Hereinafter, the definitions of terms herein will be briefly described.

"Polymerizable unsaturated bond" means an ethylenically unsaturated bond having radical polymerizability.

"Structural unit having a hydroxy group in a side chain" is a structural unit that has a side chain branched from a main chain, and that the hydroxy group contained in the side chain is bonded to a carbon atom constituting the main chain directly or via another atom or an atomic group.

"Structural unit having a urethane bond in a side chain" is a structural unit that has a side chain branched from a main chain, and that the urethane bond contained in the side chain is bonded to a carbon atom constituting the main chain directly or via another atom or an atomic group.

"(Meth)acryl" means acryl and methacryl; "(meth)acrylate" means acrylate and methacrylate; and "(meth)acryloyl" means acryloyl and methacryloyl.

"Radiation" is a generic term for ionizing radiation including light such as ultraviolet light; laser; or an electron beam.

The present invention is a method for producing a polyfunctional polymer that contains a structural unit having a urethane bond and a polymerizable unsaturated bond in a side chain, and is characterised by including a reaction process in which a polymer (P) containing a structural unit (a) having a hydroxy group in a side chain and a monomer (M) having an isocyanate group and a polymerizable unsaturated bond are reacted in the presence of a bismuth carboxylate.

The present invention is a polyfunctional polymer obtained by the above production method.

Effects of the Invention

According to the present invention, a polyfunctional polymer can be efficiently produced. The obtained polyfunctional polymer is suitable as a raw material for a composition used for a pressure-sensitive adhesive (adhesive), a sealant, a coating material, and the like.

EMBODIMENTS FOR CARRYING OUT THE INVENTION

A method for producing a polyfunctional polymer in the present invention is a production method of a polyfunctional polymer that contains a structural unit having a urethane bond and a polymerizable unsaturated bond in a side chain, and includes a reaction process in which a polymer (P) containing a structural unit (a) having a hydroxy group in a side chain and a monomer (M) having an isocyanate group and a polymerizable unsaturated bond are reacted in the presence of a bismuth carboxylate. The reaction process leads to a reaction mixture containing a polyfunctional polymer. Thereafter, the production method may include, if necessary, a purification process (described later) for purifying the polyfunctional polymer.

In the reaction process, a polymer (P) containing a structural unit (a) having a hydroxy group in a side chain and a monomer (M) having an isocyanate group and a polymerizable unsaturated bond are reacted in the presence of a bismuth carboxylate.

The polymer (P) is a polymer containing a structural unit having a hydroxy group in a side chain (hereinafter referred to as a "structural unit (a)"), and may be either a homopolymer or a copolymer. The polymer (P) may also be a copolymer containing other structural unit (hereinafter referred to as a "structural unit (b)").

A content of the hydroxy group in the polymer (P) is preferably in a range from 0.02 to 10 mmol, more preferably from 0.02 to 6 mmol, and further preferably from 0.02 to 3 mmol based on 1 g of the polymer (P).

A content ratio of the structural unit (a) in the polymer (P) is preferably in a range from 1% to 40% by mass, more preferably from 1% to 20% by mass, and further preferably from 1% to 10% by mass based on 100% by mass of a total of all structural units constituting the polymer (P).

The structural unit (a) is a structural unit having a hydroxy group in a side chain, and is a structural unit derived from a hydroxy group containing monomer (described later). A number of the side chains in one structural unit is not particularly limited, and may be 1 or 2 or more. In the case where the structural unit has a plurality of side chains, at least one side chain of the side chains contains a hydroxy group.

A number of the hydroxy groups in the structural unit (a) is not particularly limited.

Examples of the structural unit (a) include a structural unit represented by the general formula (1) (hereinafter referred to as a "structural unit (a-1)").

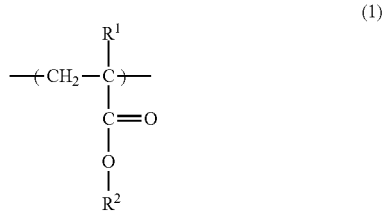

(In the formula, $R^1$ is a hydrogen atom or a methyl group, and $R^2$ is a hydroxy group containing hydrocarbon group having 1 to 24 carbon atoms in which at least one hydrogen atom is substituted with a hydroxy group.)

The structural unit (a-1) represented by the above general formula (1) is particularly preferably a structural unit in which $R^1$ is a hydrogen atom or a methyl group, and $R^2$ is a hydroxy group containing hydrocarbon group having 1 to 8 carbon atoms in which at least one hydrogen atom bonded to a hydrocarbon group is substituted with a hydroxy group. The structural unit may be formed from a (meth)acrylic acid hydroxyalkyl ester such as 2-hydroxyethyl (meth)acrylate, 3-hydroxypropyl (meth)acrylate, 4-hydroxybutyl (meth) acrylate, 6-hydroxyhexyl (meth)acrylate, 8-hydroxyoctyl (meth)acrylate and (4-hydroxymethylcyclohexyl)methyl (meth)acrylate.

Examples of the structural unit (a) other than the structural unit (a-1) include a structural unit having a side chain branched from a main chain in which a side chain having a hydroxy group further has both a urethane bond and a polymerizable unsaturated bond; a structural unit having a side chain branched from a main chain in which a side chain having a hydroxy group further has a carbonyl group or an ether bond; a structural unit having a side chain branched from a main chain and further containing an atom other than a carbon atom and a hydrogen atom; a structural unit having a side chain branched from a main chain and having a polyalkylene glycol skeleton; and the like. In these other structural units, the hydroxy group in the side chain may be at a terminal of the side chain or not.

The structural unit (b) may be a structural unit having a functional group other than a hydroxy group. For example, the structural unit (b) may be a structural unit containing a polymerizable unsaturated bond, an ester bond, a urethane bond, an ether bond, a hydrocarbon group, an oxazoline group, a carboxy group, an amino group, an amide group, a sulfonic acid group, a phosphoric acid group, an epoxy group, and the like. Such a structural unit may be formed from an acryl-based compound such as (meth)acrylic acid, methyl (meth)acrylate, ethyl (meth)acrylate, n-propyl, (meth)acrylate, isopropyl (meth)acrylate, n-butyl (meth) acrylate, isobutyl (meth)acrylate, tert-butyl (meth)acrylate, n-hexyl (meth)acrylate, n-octyl (meth)acrylate, 2ethylhexyl (meth)acrylate, isononyl (meth)acrylate, decyl (meth)acrylate, lauryl (meth)acrylate, stearyl (meth)acrylate, isostearyl (meth)acrylate, cyclohexyl (meth)acrylate, isobornyl (meth) acrylate, adamantyl (meth)acrylate, phenyl (meth)acrylate, benzyl (meth)acrylate, dicyclopentanyl (meth)acrylate, methoxyethyl (meth)acrylate, ethoxyethyl (meth)acrylate, butoxyethyl (meth)acrylate, methoxyethoxyethyl (meth) acrylate, ethoxyethoxyethyl (meth)acrylate, tetrahydrofurfuryl (meth)acrylate, phenoxyethyl (meth)acrylate, phenoxyethoxyethyl (meth)acrylate, biphenoxyethyl (meth)acrylate, biphenoxyethoxyethyl (meth)acrylate, norbornyl (meth) acrylate, phenylepoxy (meth)acrylate, (meth)acryloyl morpholine, N-[2-(meth)acryloylethyl]-1,2-cyclohexanedicarboimide, N-[2-(meth)acryloylethyl]-1,2-cyclohexanedicarboimido-1-ene, N-[2-(meth)acryloylethyl]-1,2-cyclohexanedicarboimido-4-ene, γ-(meth)acryloyloxypropyltrimethoxysilane, N-methyl-N-isopropyl (meth)acrylamide, N-isopropyl acrylamide, N-n-propyl (meth)acrylamide, N,N-diethyl (meth)acrylamide, N-(meth)acryloylmorpholine, N,N-dimethylaminoethyl (meth)acrylate, N,N-dimethylaminopropyl (meth)acrylate, N,N-dimethyl (meth)acrylamide, diacetone acrylamide, 2-(meth)acryloyloxyethyl succinate, 3-(meth)acryloyloxypropyl succinate, 2-(meth) acryloyloxyethyl maleate, 3-(meth)acryloyloxypropyl maleate, 2-(meth)acryloyloxyethyl phthalate, and 3-(meth) acryloyloxypropyl phthalate; an aliphatic vinyl compound such as vinyl acetate, allyl acetate, vinyl propionate, vinyl pivalate, maleic anhydride, itaconic anhydride, and citraconic anhydride; an aromatic vinyl compound such as styrene, α-methyl styrene, o-methyl styrene, p-methyl styrene, β-methyl styrene, ethyl styrene, p-tert-butyl styrene, vinyl toluene, vinyl xylene, vinyl naphthalene, and vinyl benzoate; a cyanidated compound such as acrylonitrile, methacrylonitrile, ethacrylonitrile, α-ethyl acrylonitrile, and α-isopropyl acrylonitrile; or the like.

The monomer (M) is a compound having an isocyanate group and a polymerizable unsaturated bond. Numbers of the isocyanate group and polymerizable unsaturated bond in the monomer (M) are not particularly limited. The monomer (M) is preferably a compound having an isocyanate group and a (meth)acryloyloxy group.

Examples of the monomer (M) include 2-(meth)acryloyloxyethyl isocyanate, (meth)acryloyl isocyanate, 1,1-bis (acryloyloxymethyl)ethyl isocyanate, 2-(0-[1'-methylpropylideneamino]carboxyamino)ethyl methacrylate, 2-[(3,5-dimethylpyrazolyl)carbonylamino]ethyl methacrylate, m-isopropenyl-α,α-dimethylbenzyl isocyanate, and the like. Among them, 2-(meth)acryloyloxyethyl isocyanate, 1,1-(bisacryloyloxymethyl)ethyl isocyanate, (2-(0-[1'-methylpropylideneamino]carboxyamino)ethyl methacrylate and 2-[(3, 5-dimethylpyrazolyl)carbonylamino]ethyl methacrylate are preferable, and 2-(meth)acryloyloxyethyl isocyanate is particularly preferable.

For example, commercially available products such as "Karenz MOI", "Karenz AOI", "Karenz BEI", and "Karenz MOI-EG" (trade names) manufactured by Showa Denko KK may be used as the monomer (M).

The bismuth carboxylate is a catalyst that promotes a reaction of a hydroxy group in the polymer (P) and an isocyanate group in the monomer (M) to form a urethane bond, and is usually represented by $Bi(OOCR^{20})_3$, (in the formula, $R^{20}$ is a hydrocarbon group).

The bismuth carboxylate is preferably a compound in which each of three $R^{20}$s in the general formula is independently a hydrocarbon group having 1 to 17 carbon atoms since it causes the reaction to smoothly proceed.

The amount of the bismuth carboxylate to be used is preferably in a range from 0.001 to 5 parts by mass and preferably from 0.001 to 1 part by mass based on 100 parts by mass of the polymer (P) from a viewpoint of reactivity.

Amounts of the polymer (P) and the monomer (M) to be used in the reaction process are set such that a molar ratio ($M_{NCO}/P_{OH}$) of an isocyanate group in the monomer (M) to a hydroxy group in the polymer (P) is preferably in a range from 0.1 to 1, and more preferably from 0.4 to 1 from the viewpoint of smooth reactivity.

The reaction in the reaction process is usually conducted in an organic solvent containing a hydrocarbon, a ketone, an ester, an ether, an aromatic compound, or the like. That is, the polymer (P), the monomer (M), and the bismuth carboxylate that is a catalyst for forming a urethane bond are stirred while being bubbled with dry air in the organic solvent. A reaction temperature is preferably in a range from 65° C. to 90° C., and more preferably from 70° C. to 85° C. A reaction time is preferably in a range from 4 to 36 hours, and more preferably from 6 to 15 hours.

In the reaction process, it is preferable to add a polymerization inhibitor to the reaction system for the purpose of suppressing the reaction of the carbon-carbon unsaturated double bond in the monomer (M). As the polymerization inhibitor, hydroquinone, phenothiazine, and the like can be used.

After the reaction process, a purification process for removing the unreacted raw materials, the organic solvent, the catalyst, and the like can be conducted, if necessary. Examples of the purification method include removal of impurities by heating, removal of impurities by vacuum drying, and the like. In the case of removing the impurities by heating, it is preferable to remove the impurities at a temperature of 140° C. or lower from the viewpoint of protection of the polymerizable unsaturated bond.

A structure of the polyfunctional polymer obtained by the present invention varies depending on a molar ratio of the hydroxy group in the polymer (P) and the isocyanate group in the monomer (M).

When a polymer (P) containing the structural unit (a-1) represented by the general formula (1) and a monomer (M) are used, a polyfunctional polymer containing a structural unit (f-1) represented by the general formula (2) can be obtained. The polyfunctional polymer may contain an unreacted structural unit (a-1).

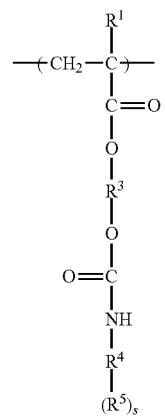

(In the formula, $R^1$ is a hydrogen atom or a methyl group; $R^3$ is a divalent organic group, and is a hydrocarbon group having 1 to 24 carbon atoms in which a hydrogen atom may be substituted with other atom or a functional group; $R^4$ is a divalent or trivalent hydrocarbon group having 1 to 24 carbon atoms or a derivative group thereof; and $R^5$ is represented by the following formula:

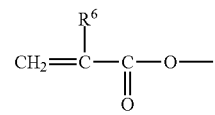

($R^6$ is a hydrogen atom or a methyl group); and s is 1 or 2.)

When a polymer containing a structural unit (a) other than the structural unit (a-1) represented by the general formula (1) is used as the polymer (P), a polyfunctional polymer containing a structural unit (f-2) having a carbonyl group or an ether bond in a side chain containing both a urethane bond and a polymerizable unsaturated bond, a polyfunctional polymer containing a structural unit (f-3) having an atom other than a carbon atom or a hydrogen atom in a side chain containing both a urethane bond and a polymerizable unsaturated bond, a polyfunctional polymer containing a structural unit (f-4) having a polyalkylene glycol skeleton in a side chain containing both a urethane bond and a polymerizable unsaturated bond, a polyfunctional polymer containing a structural unit (f-5) represented by the following general formula (3), and the like can be obtained. These polyfunctional polymers may contain other unreacted structural unit (a).

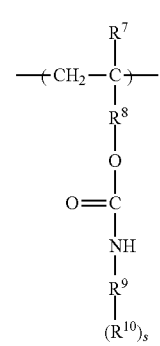

(In the formula, $R^7$ is a hydrogen atom or a methyl group; $R^8$ is a divalent hydrocarbon group having 1 to 24 carbon atoms; $R^9$ is a divalent or trivalent hydrocarbon group having 1 to 24 carbon atoms or a derivative group thereof; and $R^{10}$ is represented by the following formula:

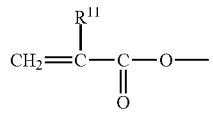

($R^{11}$ is a hydrogen atom or a methyl group); and s is 1 or 2.)

The polyfunctional polymer obtained by the present invention may contain two or more types among the structural units (f-1) to (f-5). The polyfunctional polymer preferably contains the structural unit (f-1).

A concentration of the polymerizable unsaturated bond in the polyfunctional polymer is preferably in a range from 0.05 to 1.2 mmol/g, more preferably from 0.1 to 1.0 mmol/g, and further preferably from 0.2 to 0.7 mmol/g.

The polyfunctional polymer is usually a viscous fluid, and a weight average molecular weight as determined by gel permeation chromatography is preferably in a range from 50,000 to 1,000,000, more preferably from 100,000 to 700,000, and further preferably from 150,000 to 500,000.

A bismuth component derived from the bismuth carboxylate used in the reaction process may be contained in the polyfunctional polymer recovered after the purification process. A bismuth amount is usually in a range from 3 to 500 ppm by mass, and preferably from 5 to 200 ppm by mass. Needless to say, the organotin compound is not used as a catalyst in the reaction process, whereby the polyfunctional polymer or the reaction solution containing the same does not substantially contain a tin component, and an amount of tin is less than 1 ppm by mass. When the organotin compound is used as a catalyst, a lower limit of the amount of tin in the polyfunctional polymer is usually 5 ppm by mass.

The polyfunctional polymer obtained by the present invention is suitable for wide use as described later. In particular, when the polyfunctional polymer and a polymerization initiator are used in combination to form a polymer composition containing both of them, for example, an external stimulus such as radiation or heating causes radical species derived from the polymerization initiator to crosslink the polymerizable unsaturated bond of the polyfunctional polymer, thereby to allow a cured product to be easily prepared. When such a polymer composition is used as a repeelable pressure-sensitive adhesive, the pressure-sensitive adhesive can be cured by the external stimulus to lower a tack force.

The polymer composition can be produced by a method including a mixing process in which a polyfunctional polymer and a polymerization initiator are mixed. In the mixing process, a polyfunctional polymer containing reaction solution produced by the method of the present invention may be used as it is.

The polymerization initiator used in the mixing process is not particularly limited, but is preferably a photopolymerization initiator or a thermal polymerization initiator.

The photopolymerization initiator is particularly limited as long as it is excited with energy of ultraviolet light, visible light, or near-infrared light to generate radicals, thereby to accelerate the radical polymerization of the polyfunctional polymer. Examples of the photopolymerization initiator include a benzoin such as benzoin, benzoin methyl ether, benzoin propyl ether and benzoin isobutyl ether; an acetophenone such as acetophenone, 2,2-dimethoxy-2-phenylacetophenone, 2,2-diethoxy-2-phenylacetophenone, 1,1-dichloroacetophenone, 2-hydroxy-2-methyl-1-phenyl-propane-1-one, 1-hydroxycyclohexyl phenyl ketone, 2-methyl-1-[4-(methylthio)phenyl]-2-morpholino-propane-1-one, and N,N-dimethylaminoacetophenone; an anthraquinone such as 2-methylanthraquinone, 1-chloroanthraquinone and 2-amylanthraquinone; a thioxanthone such as 2,4-dimethylthioxanthone, 2,4-diethylthioxanthone, 2-chlorothioxanthone and 2,4-diisopropylthioxanthone; a ketal such as acetophenone dimethyl ketal and benzil methyl ketal; a benzophenone such as benzophenone, methylbenzophenone, 4,4'-dichlorobenzophenone, 4,4'-bisdiethylaminobenzophenone, Michler's ketone and 4-benzoyl-4'-methyldiphenylsulfide; 2,4,6-trimethylbenzoyldiphenylphosphine oxide, bis(2,6-dimethoxybenzoyl)-2,4,4'-trimethylpentylphosphine oxide, camphorquinone, and the like. The photopolymerization initiator may be used singly or in combination of two or more types thereof.

The thermal polymerization initiator is not particularly limited as long as it generates radicals upon heating, thereby to accelerate the radical polymerization of the polyfunctional polymer. Examples of the thermal polymerization initiator include an organic peroxide and an azo compound. The thermal initiator may be used singly or in combination of two or more types thereof.

Examples of the organic peroxide include a diacyl peroxide such as lauroyl peroxide and benzoyl peroxide; an alkyl peroxy ester such as tert-butylperoxy-3,5,5-trimethyl hexanoate, cumyl peroxy neodecanoate, hexyl peroxy pivalate, tert-butyl peroxy isobutylate, tert-butyl peroxy pivalate, tert-butyl peroxy acetate, tert-butyl peroxy benzoate and tert-butyl peroxy-2-ethylhexanate; a peroxydicarbonate such as diisopropyl peroxydicarbonate, di-2-ethylhexyl peroxydicarbonate, di-n-propyl peroxydicarbonate, bis(4-tert-butyl cyclohexyl)peroxydicarbonate, di-2-ethoxyethyl peroxydicarbonate, dimethoxyisopropyl peroxydicarbonate, di(3-methyl-3-methoxybutyl)peroxydicarbonate and diallyl peroxydicarbonate; a peroxycarbonate such as tert-butyl peroxyisopropylcarbonate; a peroxyketal such as di-tert-butyl peroxy cyclohexane and di-(tert-butyl peroxy)butane; a dialkyl peroxide such as dicumyl peroxide, tert-butyl cumyl peroxide and di-tert-butyl peroxide; a hydroperoxide such as cumene hydroperoxide and tetramethyl butyl hydroperoxide; a ketone peroxide such as ketone peroxide and cyclohexanone peroxide; and the like.

Examples of the azo compound include 2,2'-azobispropane, 2,2'-dichloro-2,2'-azobispropane, 1,1'-azo(methylethyl)diacetate, 2,2'-azobis(2-amidinopropane)hydrochloride, 2,2'-azobis(2-aminopropane)nitrate, 2,2'-azobisisobutane, 2,2'-azobisisobutylamide, 2,2'-azobisiso butyronitrile, methyl 2,2'-azobis-2-methylpropionate, 2,2'-dichloro-2,2'-azobisbutane, 2,2'-azobis-2-methylbutyronitrile, 2,2'-dimethyl azobisisobutyrate, 1,1'-azobis(1-methyl-butyronitrile-3-sodium sulfonate), 2-(4-methylphenylazo)-2-methylmalonodinitrile, 4,4'-azobis-4-cyanovaleric acid, 3,5-dihydroxymethylphenylazo-2-allylmalonodinitrile, 2,2'-azobis-2-methylvaleronitrile, 4,4'-azobis-4-dimethyl cyanovalerate, 2,2'-azobis-2,4-dimethylvaleronitrile, 1,1'-azobiscyclohexanenitrile, 2,2'-azobis-2-propylbutyronitrile, 1,1'-azobiscyclohexanenitrile, 2,2'-azobis-2-propylbutyronitrile, 1,1'-azobis-1-chlorophenylethane, 1,1'-azobis-1-cyclohexanecarbonitrile, 1,1'-azobis-1-cycloheptane nitrile, 1,1'-azobis-1-phenylethane, 1,1'-azobiscumene, ethyl 4-nitrophenylazobenzyl cyanoacetate, phenylazodiphenylmethane, phenylazotriphenylmethane, 4-nitrophenylazotriphenylmethane, 1,1'-azobis-1,2-diphenylethane, poly(bisphenol A-4,4'-azobis-4-cyanopentanoate), poly(tetraethylene glycol-2,2'-azobisisobutyrate), and the like.

An amount of the polymerization initiator to be used is preferably in a range from 1 to 20 parts by mass, more preferably from 1 to 15 parts by mass, and further preferably from 2 to 10 parts by mass based on 100 parts by mass of the amount of the polyfunctional polymer to be used since the polymerizable unsaturated bond in the polyfunctional polymer can be crosslinked with high efficiency by irradiation with radiation or heating.

In the mixing process, a compound having a polymerizable unsaturated bond other than the polyfunctional polymer, an additive, a crosslinking agent, an organic solvent, and the like can be further used.

Examples of the additive include an antioxidant, an ultraviolet absorber, a plasticizer, a flame retardant, an antistatic agent, a colorant, a polymerization inhibitor, a tackifier, and the like.

Examples of the organic solvent include a hydrocarbon, a ketone, an ester, an ether, an aromatic compound, and the like.

EXAMPLES

In the specific examples, a reactivity between a polymer having a hydroxy group and a monomer having an isocyanate group and a polymerizable unsaturated bond was evaluated by the following "monomer consumption rate" and "storage elastic modulus of rubbery flat region of cured product".

(1) Monomer Consumption Rate

A polymer having a hydroxy group was reacted with a monomer having an isocyanate group and a polymerizable unsaturated bond, to produce a polyfunctional polymer. 50 mg of a reaction solution containing the polyfunctional polymer thus produced was sampled and diluted with 10 ml of acetone, followed by quantifying the residual amount of a monomer contained in a diluted solution using capillary gas chromatograph "GC-2010 Plus" (model name) manufactured by Shimadzu Corporation. A detector in this measurement is "FID-2010 Plus" (model name) manufactured by Shimadzu Corporation, and a column to be used is "HP-5 MS" (model name) manufactured by Agilent Technologies. Based on the analysis values, the residual amount of the monomer contained in the reaction solution before the dilution with acetone was determined, and an amount of the monomer consumed by the reaction was calculated to obtain a consumption rate of the monomer.

The consumption rate of the monomer could be determined by the method, but the obtained consumption rate also included a monomer consumed by a side reaction, whereby the amount of the polymerizable unsaturated bond added to the polymer was evaluated using a method to be described later in addition to the method described above. A polymer having a hydroxy group was reacted with a monomer having an isocyanate group and a polymerizable unsaturated bond, to obtain a reaction solution containing a polyfunctional polymer. To the produced reaction solution containing a polyfunctional polymer, a photopolymerization initiator was added to produce a polymer composition. The composition was applied and dried to form an uncrosslinked coated film, and the coated film was then irradiated with a sufficient amount of radiation to sufficiently crosslink the polymerizable unsaturated bond of the polyfunctional polymer to obtain a cured product. The cured product was subjected to a tensile storage elastic modulus measurement in the rubbery flat region, and the tensile storage elastic modulus was used as a reference for an addition amount of the polymerizable unsaturated bond.

This method makes possible to react the polymerizable unsaturated bond added to the polyfunctional polymer with high efficiency, and the reacted polymerizable unsaturated bond serves as a crosslinking point between the polymers, thereby to increase a crosslinking density of the composition. That is, the crosslinking density is increased in accordance with the amount of the polymerizable unsaturated bond added to the polymer, and the crosslinking density is reflected in the tensile storage elastic modulus of the rubbery flat region. Therefore, the crosslinking density and the amount of the polymerizable unsaturated bond added to the polymer can be compared by the comparison of the tensile storage elastic modulus of the rubbery flat region. When the amount of the polymerizable unsaturated bond added to the polymer is large, the tensile storage elastic modulus of the rubbery flat region has a high value. When the amount of the added polymerizable unsaturated bond is small, the tensile storage elastic modulus of the rubbery flat region has a low value. Hereinafter, the evaluation procedure will be described in detail.

(2) Storage Elastic Modulus of Rubbery Flat Portion of Cured Product

A polymer composition was prepared by mixing a specific amount of photopolymerization initiator based on 100 parts by mass of a polyfunctional polymer with a polyfunctional polymer containing reaction solution obtained by a method described in the following Examples and Reference Examples. The polymer composition was applied on a release-treated surface of a release film "Purex A31" (trade name, thickness: 38 μm) manufactured by Teijin DuPont Film Japan Limited so that a thickness after drying was 100 μm, followed by drying at a temperature of 130° C. for 5 minutes. Thereafter, another of the same release film was pasted on the obtained uncrosslinked coated film to obtain a laminated sheet in which the uncrosslinked coated film was sandwiched between the release films. Then, one surface of the laminated sheet was irradiated with ultraviolet light under conditions of an illuminance of 100 mW/cm$^2$ and a light amount of 1080 mJ/cm$^2$ using an ultraviolet irradiation device "UVX-02528S1AJA02" (model name) manufactured by Ushio Inc., to crosslink the polymerizable unsaturated bond, thereby to obtain a cured film. The tensile storage elastic modulus of the cured film was measured using a dynamic viscoelasticity apparatus "RSA-3" (model name) manufactured by TA Instrument Co., Ltd. The measurement conditions include a distance between chucks of 20 mm, a sample width of 10 mm, a frequency of 1 Hz, a strain of 0.1%, and a heating rate of 5° C./min. In each of the following experimental examples, the tensile storage elastic modulus at a temperature of 150° C. was adopted as the elastic modulus of the rubbery flat region.

Example 1

80 parts by mass of n-butyl acrylate, 13 parts by mass of methyl methacrylate, 7 parts by mass of 2-hydroxyethyl acrylate, and 0.25 parts by mass of tert-butylperoxy-2-ethylhexanoate "PERBUTYL O" (trade name, polymerization initiator) manufactured by NOF Corporation were supplied into a mixed solvent composed of toluene and ethyl acetate, and a polymerization reaction was conducted in a nitrogen stream at a temperature of 80° C. to 85° C. for 11 hours to obtain a polymer (p1) having a hydroxy group. A weight average molecular weight of the polymer (p1) in terms of polystyrene by GPC was 320,000.

Subsequently, 7 parts by mass of 2-methacryloyloxyethyl isocyanate, 0.05 part by mass of 2-ethylhexanoate bismuth, 0.05 parts by mass of bismuth 2-ethylhexanoate (catalyst), and 0.05 part by mass of phenothiazine (polymerization inhibitor) based on 100 parts by mass of the polymer (p1) were added to the reaction solution of the polymer (p1) for a urethanization reaction at a temperature of 75° C.±5° C. for 12 hours to obtain a polyfunctional polymer (X1). A weight average molecular weight of the polyfunctional polymer (X1) in terms of polystyrene by GPC was 324,000. Then, an amount of 2-methacryloyloxyethyl isocyanate remaining in the reaction solution was analyzed by gas chromatography to be 22% by mass. A consumption rate of 2-methacryloyloxyethyl isocyanate was 78% by mass. An amount of bismuth contained in the polyfunctional polymer (X1) was analyzed by an ICP emission spectroscopic analyzer to be 39 ppm by mass.

After that, in order to evaluate a crosslinking density of a cured product obtained by crosslinking the polyfunctional polymer (X1) in the presence of a photopolymerization initiator, 6 parts by mass of 2-benzyl-2-dimethylamino-1-(4-morpholinophenyl)-butanone-1 "IRGACURE 369" (trade name, photopolymerization initiator) manufactured by BASF based on 100 parts by mass of the polyfunctional polymer (X1) were mixed with the reaction solution of the polyfunctional polymer (X1), to obtain a polymer composition.

Using this polymer composition, a cured film was prepared by the above method, and a tensile storage elastic modulus at a temperature of 150° C. as the elastic modulus of a rubbery flat region was measured to be $7.9 \times 10^6$ Pa (see Table 1).

Example 2

A polyfunctional polymer (X2) was obtained in the same manner as in Example 1 except that bismuth neodecanoate was used in place of bismuth 2-ethylhexanoate. A weight average molecular weight of the polyfunctional polymer (X2) in terms of polystyrene by GPC was 323,000. An amount of bismuth contained in the polyfunctional polymer (X2) was analyzed by an ICP emission spectroscopic analyzer to be 60 ppm by mass. An amount of 2-methacryloyloxyethyl isocyanate remaining in the reaction solution was analyzed by gas chromatography to be 16% by mass. A consumption rate of 2-methacryloyloxyethyl isocyanate was 84% by mass.

After that, a preparation of a polymer composition containing a photopolymerization initiator, a production of a cured film by ultraviolet light irradiation, and a tensile storage elastic modulus measurement were conducted in the same manner as in Example 1. The results are shown in Table 1.

Reference Example 1

A polyfunctional polymer (X3) was obtained in the same manner as in Example 1 except that dibutyltin dilaurate was used in place of bismuth 2-ethylhexanoate. A weight average molecular weight of the polyfunctional polymer (X3) in terms of polystyrene by GPC was 325,000. An amount of tin contained in the polyfunctional polymer (X3) was analyzed by an ICP emission spectroscopic analyzer to be 40 ppm by mass. An amount of 2-methacryloyloxyethyl isocyanate remaining in the reaction solution was analyzed by gas chromatography to be 20% by mass. A consumption rate of 2-methacryloyloxyethyl isocyanate was 80% by mass.

After that, a preparation of a polymer composition containing a photopolymerization initiator, a production of a cured film by ultraviolet light irradiation, and a tensile storage elastic modulus measurement were conducted in the same manner as in Example 1. The results are shown in Table 1.

Reference Example 2

A polyfunctional polymer (X4) was obtained in the same manner as in Example 1 except that zirconium neodecanoate was used in place of bismuth 2-ethylhexanoate. A weight average molecular weight of the polyfunctional polymer (X4) in terms of polystyrene by GPC was 325,000. An amount of 2-methacryloyloxyethyl isocyanate remaining in the reaction solution was analyzed by gas chromatography to be 15% by mass. A consumption rate of 2-methacryloyloxyethyl isocyanate was 85% by mass.

After that, a preparation of a polymer composition containing a photopolymerization initiator, a production of a cured film by ultraviolet light irradiation, and a tensile storage elastic modulus measurement were conducted in the same manner as in Example 1. The results are shown in Table 1.

Reference Example 3

A polyfunctional polymer (X5) was obtained in the same manner as in Example 1 except that zinc dithiocarbamate was used in place of bismuth 2-ethylhexanoate. A weight average molecular weight of the polyfunctional polymer (X5) in terms of polystyrene by GPC was 324,000. An amount of 2-methacryloyloxyethyl isocyanate remaining in the reaction solution was analyzed by gas chromatography to be 10% by mass. A consumption rate of 2-methacryloyloxyethyl isocyanate was 90% by mass.

After that, a preparation of a polymer composition containing a photopolymerization initiator, a production of a cured film by ultraviolet light irradiation, and a tensile storage elastic modulus measurement were conducted in the same manner as in Example 1. The results are shown in Table 1.

Reference Example 4

A polyfunctional polymer (X6) was obtained in the same manner as in Example 1 except that titanium diisopropoxy bis(ethyl acetate) was used in place of bismuth 2-ethylhexanoate. A weight average molecular weight of the polyfunctional polymer (X5) in terms of polystyrene by GPC was 321,000. An amount of 2-methacryloyloxyethyl isocyanate remaining in the reaction solution was analyzed by gas chromatography to be 35% by mass. A consumption rate of 2-methacryloyloxyethyl isocyanate was 65% by mass.

After that, a preparation of a polymer composition containing a photopolymerization initiator, a production of a cured film by ultraviolet light irradiation, and a tensile storage elastic modulus measurement were conducted in the same manner as in Example 1. The results are shown in Table 1.

TABLE 1

| | Example 1 | Example 2 | Reference Example 1 | Reference Example 2 | Reference Example 3 | Reference Example 4 |
|---|---|---|---|---|---|---|
| Polyfunctional polymer | (X1) | (X2) | (X3) | (X4) | (X5) | (X6) |
| Consumption rate of 2-methacryloyloxyethyl isocyanate (% by mass) | 78 | 84 | 80 | 85 | 90 | 65 |
| Tensile storage elastic modulus (Pa) | 7.9E+06 | 8.0E+06 | 8.0E+06 | 4.8E+06 | 6.0E+06 | 4.2E+06 |

INDUSTRIAL APPLICABILITY

The present invention causes a reaction between a polymer (P) and a monomer (M) to efficiently proceed. Therefore, the obtained polyfunctional polymer or a reaction product containing the same is suitable as a raw material for a composition used for a pressure-sensitive adhesive (adhesive), a sealant, a coating material, and the like. The obtained polyfunctional polymer or the reaction product containing the same is particularly suitable as a raw material for a pressure-sensitive adhesive used in an electronic material field and a semiconductor material field where a raw material to be used is severely restricted by the REACH regulation.

The invention claimed is:

1. A method for producing a polyfunctional polymer comprising a structural unit having a urethane bond and a polymerizable unsaturated bond in a side chain, characterised by comprising a reaction process in which a polymer (P) comprising a structural unit (a) having a hydroxy group in a side chain and a monomer (M) having an isocyanate group and a polymerizable unsaturated bond are reacted in the presence of a bismuth carboxylate,
   wherein a molar ratio ($M_{NCO}/P_{OH}$) of an isocyanate group in the monomer (M) to a hydroxy group in the polymer (P) is in a range from 0.1 to 1 in the reaction process,
   wherein the monomer (M) is at least one compound selected from a group consisting of 2-methacryloyloxyethyl isocyanate, 2-acryloyloxyethyl isocyanate, 1,1-(bis acryloyloxymethyl)ethyl isocyanate and 2-[(3,5-dimethylpyrazolyl)carboxyamino]ethyl methacrylate,
   wherein a content ratio of the structural unit (a) in the polymer (P) is in a range from 1% to 20% by mass, and
   wherein the structural unit (a) contains a structure represented by a following formula (1):

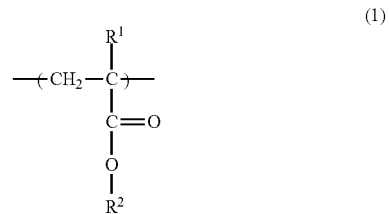

(1)

wherein $R^1$ is a hydrogen atom or a methyl group, and $R^2$ is a hydroxy group containing hydrocarbon group having 1 to 24 carbon atoms in which at least one hydrogen atom is substituted with a hydroxy group.

2. The method according to claim 1, wherein the bismuth carboxylate is a compound that is represented by $Bi(OOCR^{20})_3$,
   wherein each of three $R^{20}$s is independently a hydrocarbon group having 1 to 17 carbon atoms.

3. The method according to claim 1, wherein the bismuth carboxylate is used in an amount from 0.001 to 5 parts by mass based on 100 parts by mass of the polymer (P).

4. A polyfunctional polymer obtained by the method according to claim 1.

* * * * *